United States Patent
Cox

(10) Patent No.: US 7,024,499 B2
(45) Date of Patent: *Apr. 4, 2006

(54) CACHE ONLY QUEUE OPTION FOR CACHE CONTROLLER

(75) Inventor: Alan Cox, Swansea (GB)

(73) Assignee: Red Hat, Inc., Raleigh, NC (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 10/348,041

(22) Filed: Jan. 21, 2003

(65) Prior Publication Data

US 2004/0143687 A1    Jul. 22, 2004

(51) Int. Cl.
*G06F 3/00* (2006.01)

(52) U.S. Cl. .............. 710/57; 710/53; 710/54; 710/55; 710/56; 710/6; 710/39

(58) Field of Classification Search .......... 710/5, 710/6, 36, 39, 52, 54, 57

See application file for complete search history.

(56) References Cited

U.S. PATENT DOCUMENTS

| | | | | |
|---|---|---|---|---|
| 5,649,157 A | * | 7/1997 | Williams | 711/151 |
| 5,784,647 A | * | 7/1998 | Sugimoto | 710/39 |
| 5,815,648 A | * | 9/1998 | Giovannetti | 714/5 |
| 5,944,838 A | * | 8/1999 | Jantz | 714/6 |
| 5,991,825 A | * | 11/1999 | Ng | 710/6 |
| 6,182,176 B1 | * | 1/2001 | Ziegler et al. | 710/112 |
| 6,292,856 B1 | * | 9/2001 | Marcotte | 710/39 |
| 6,311,256 B1 | * | 10/2001 | Halligan et al. | 711/158 |
| 6,564,271 B1 | * | 5/2003 | Micalizzi et al. | 710/39 |
| 2002/0138670 A1 | * | 9/2002 | Johnson | 710/6 |

* cited by examiner

*Primary Examiner*—Kim Huynh
*Assistant Examiner*—Alan S. Chen
(74) *Attorney, Agent, or Firm*—Wilmer Cutler Pickering Hale and Dorr LLP

(57) ABSTRACT

A disk input/output (I/O) system includes a controller, a cache, a disk I/O subsystem, and a command queue. The load on the queue is monitored and when it reaches a threshold, commands are designated cache only. Cache only commands are added to the queue only if they can be completed without accessing the disk I/O subsystem. If the disk I/O subsystem would be accessed in order to complete a cache only command, the command is returned to the operating system with an error. The operating system can then add the command to an operating system or back-up queue.

8 Claims, 3 Drawing Sheets

CACHE ONLY QUEUE OPTION FOR CACHE CONTROLLER

FIELD OF THE INVENTION

This invention relates to disk input/output (I/O) systems and, more particularly, to cache controllers for disk I/O systems.

BACKGROUND OF THE INVENTION

Many computing systems allow multiple disk I/O requests to be sent to a controller with a cache, without the system needing to wait for prior requests to complete before sending additional requests. The system accesses the disk or the cache by issuing I/O requests.

The controller typically includes a command queue. As the system receives new commands, they are placed on the queue. Commands that can be completed from the cache will complete more quickly than commands that require the system to access the disks.

I/O commands can be divided into three general categories: read, write, and control. Relatively few commands tend to fall within the control category, and these commands tend not to have a significant impact on performance. Read and write commands can be divided into two categories. "Fast" commands that may be fulfilled from the cache, and "slow" commands that require activity on the underlying (and slower) I/O subsystem.

In many cases, the slower commands can interfere with the system's ability to receive and process the faster cache commands, because the queue is of a limited size.

SUMMARY OF THE INVENTION

The present invention allows for increased efficiency in executing I/O commands by providing a new means for implementing the command queue. The operating system (or the controller) monitors the status of the queue.

In some embodiments, if the queue becomes sufficiently loaded, commands may be designated "cache-only." A cache-only command will be placed in the queue only if it can be completed without accessing the underlying I/O subsystem. If the command involves accessing the I/O subsystem, it is not placed in the queue, so that the queue will not become full. Instead, the command is placed in a back-up or operating system queue, from which it can be added to the controller queue when the load is reduced.

In other embodiments, if the controller determines that the queue is sufficiently loaded, it fails commands that would involve accessing the I/O subsystem, so that those commands do not take up slots in the queue. For example, the controller can respond to a command with a "queue full" response, if the queue is sufficiently full and the command will involve accessing the I/O subsystem.

DETAILED DESCRIPTION OF PREFERRED EMBODIMENTS

Figure 1:
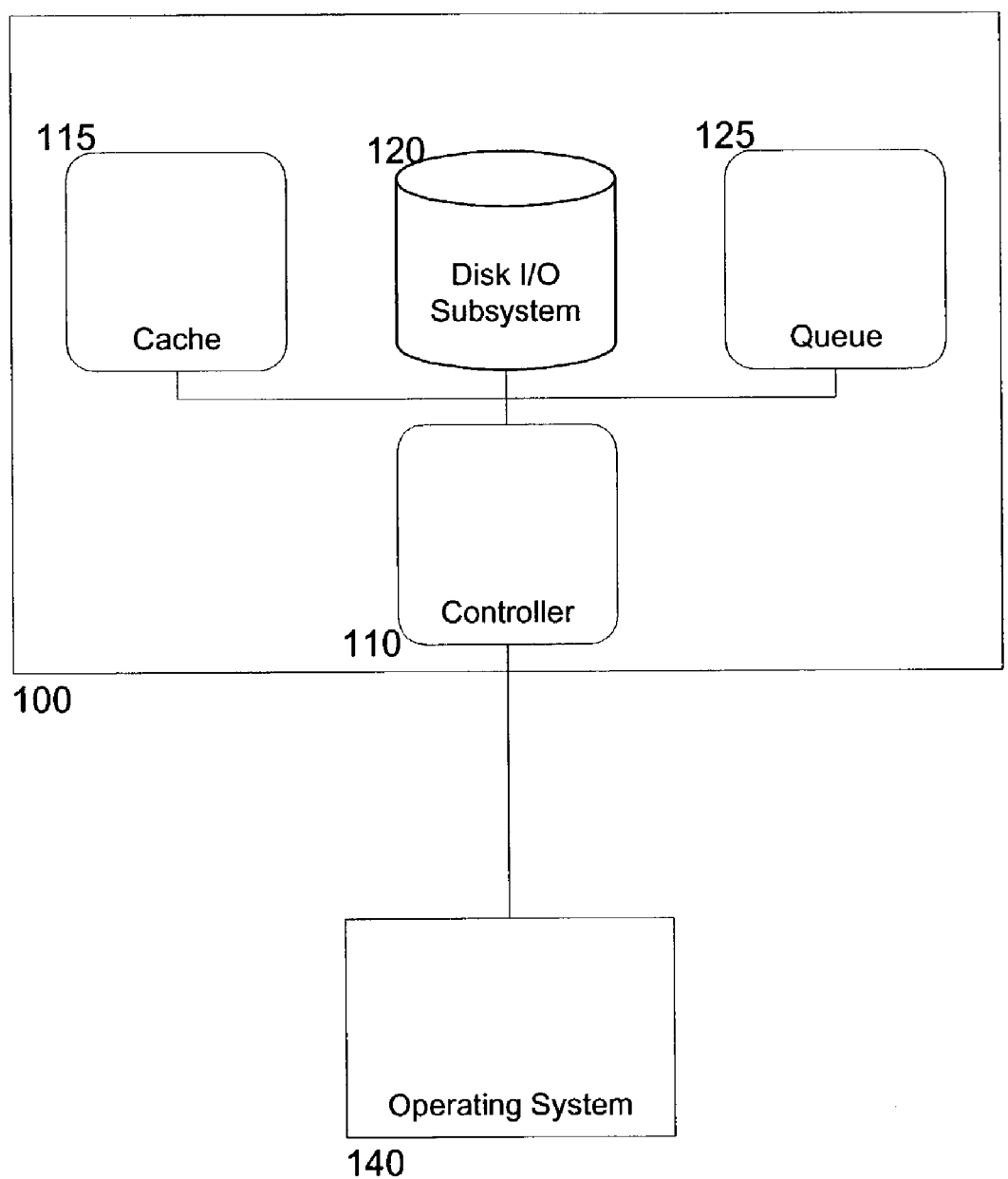
FIG. 1 is a block diagram illustrating portions of an I/O control system according to an embodiment of the present invention.

As shown in FIG. 1, I/O control system 100 of a computing system includes controller 110, cache 115, disk I/O subsystem 120, and queue 125. Controller 110 controls access to cache 115 and disk I/O subsystem 120. Operating system 140 sends I/O commands to controller 110, and the commands typically are placed in queue 125.

Figure 2:
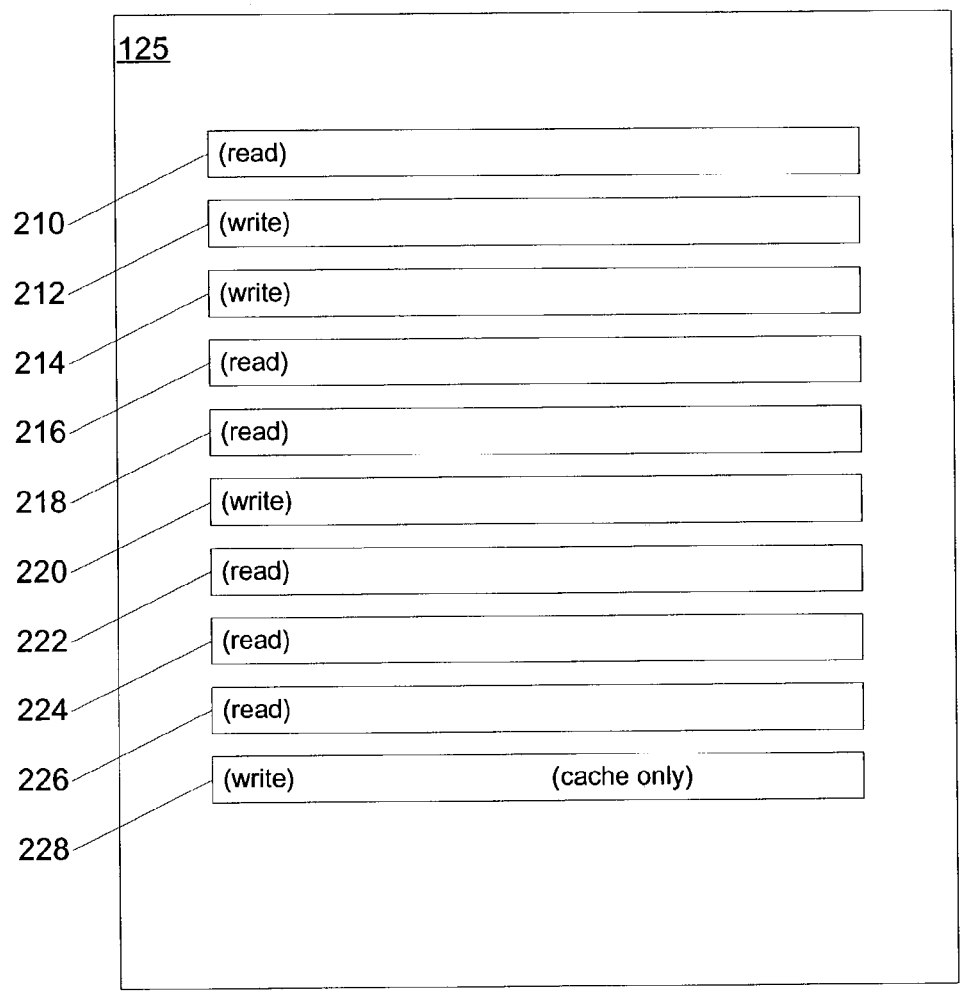
FIG. 2 is a block diagram illustrating portions of a queue for an I/O control system according to an embodiment of the present invention.

Queue 125 typically includes a variety of read, write, and control commands. As illustrated in FIG. 2, queue 125 includes read commands 210, 216, 218, 222, 224, and 226; and write commands 212, 214, 220, and 228. The commands in queue 125 typically are not executed in a first-in-first-out (FIFO) manner, but rather controller 110 looks at all or a portion of the commands in the queue and attempts to order and group the commands for efficiency. In this example, read command 226 and write command 228 only involve cache accesses and can be executed quickly. Controller 110 can use any appropriate algorithm to identify whether the requested data is in the cache. Although dependent on the particular controller algorithm, these commands often will be executed immediately to provide faster performance and to free up space in the queue.

In this example, operating system 140 designated the most recent command (write command 228) as "cache only" because the queue is almost full. The determination of when the queue is almost full will depend on the application and the particular requirements of the system, and may be based on the space available in the queue, an estimate of the amount of time required to complete some of the existing commands, an estimate of the amount of time (based on past performance and/or expected future requests) until the queue becomes full, the types of commands already in the queue, and/or other factors.

The almost full determination may be made to ensure that enough cache only commands are present so that the operating system should not have to wait before sending a command. For example, if the queue had one available slot, after the operating system sent a new command it would have to wait for a command to be processed before sending the next command. However, if the queue had three available slots when the queue was deemed almost full, the queue would not become full unless the operating system sent four commands before the controller could process one command or sent two bursts of several commands before the controller could process several commands.

If command 228 had involved accessing the I/O subsystem, controller 110 would have returned the command with an error, without attempting to execute the command, so as to free up queue space.

Alternatively, controller 110 could determine when the queue is almost full, rather than operating system 140. In this case, controller 110 would consider new commands as "cache only" until the queue became less full, and again return a command with an error if the command involved accessing the I/O subsystem. This embodiment may be implemented with few if any changes to the driver and interfaces between the controller and other parts of the computing system. The controller could return a "queue full" error when the queue is almost full and it receives a command that cannot be completed just by using the cache.

The threshold (as the queue becomes more full) for determining when to designate future commands as cache only can be different or the same as the threshold (as the queue becomes less full) for allowing commands that involve accessing the I/O subsystem. The threshold(s) may be fixed or adjustable.

Figure 3:
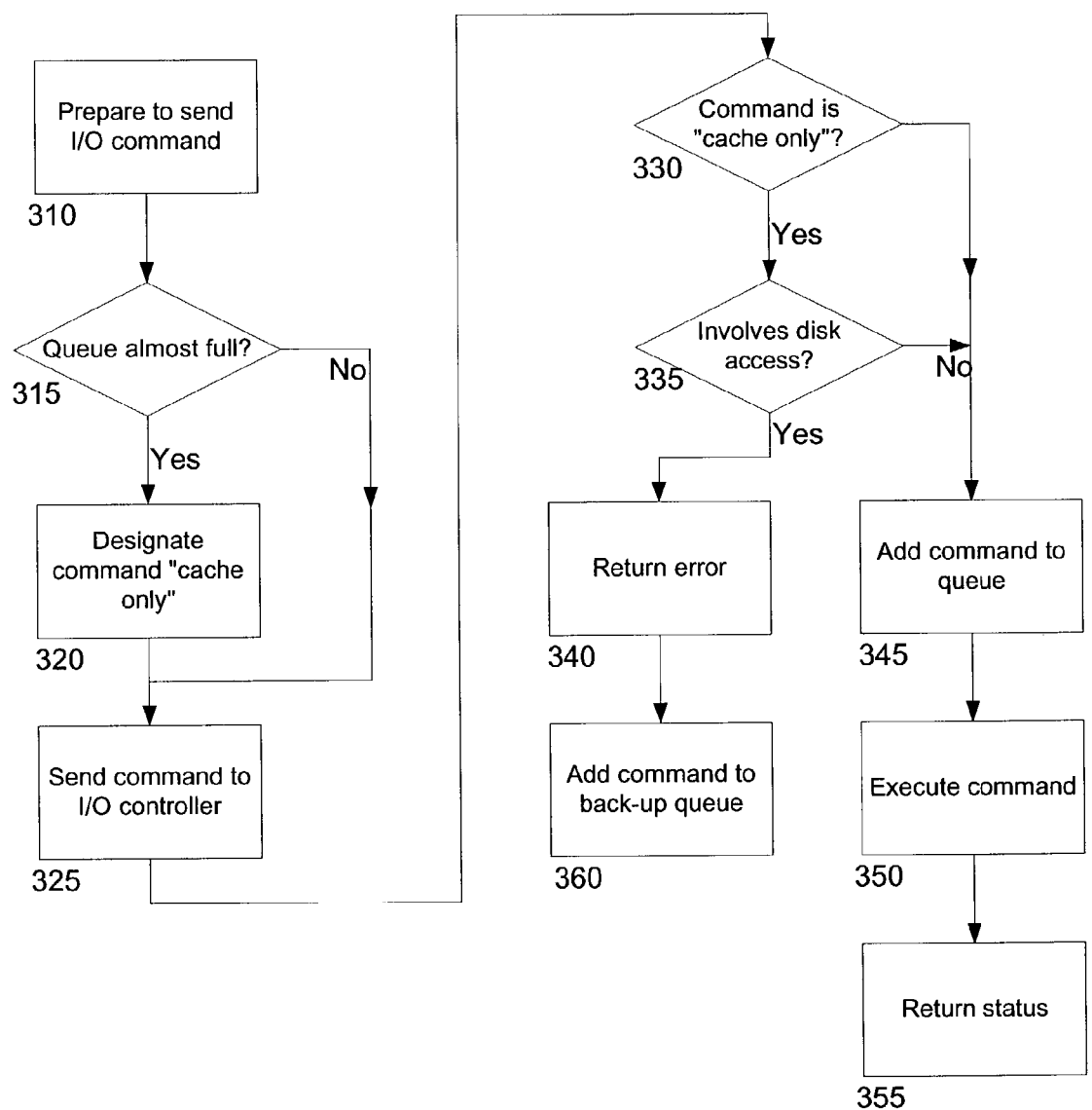
FIG. 3 is a flow diagram illustrating control of a queue according to an embodiment of the present invention.

FIG. 3 illustrates an exemplary series of steps to implement a cache-only option. At step 310, the operating system prepares to send an I/O command to the controller. The operating system determines, at step 315, whether the queue is almost full. If so, the command is designated "cache only" (step 320). At step 325, the command is sent to the I/O controller.

The I/O controller determines, at step 330, whether the command has been designated "cache only." If not, then the command is added to the queue, at step 345.

If the command has been designated "cache only," then the I/O controller determines whether the command can be completed without accessing the disk I/O subsystem (step 335). Generally, this will be determined by whether the data to be written or read can be found in the cache. If, in order to complete the command, the I/O system must access the disk I/O subsystem, then (because the command was determined in step 330 to be a cache only command) the command is returned to the operating system with an error (step 340). The operating system then adds the command to an operating system or back-up queue (step 360). If the cache-only command will not involve accessing the disk I/O subsystem, the command is added to the queue (step 345).

According to a sequence determined by the disk controller's algorithm, the command will be executed at step 350. A command that can be completed without accessing the disk I/O subsystem generally will be executed immediately, or as soon as commands with a higher priority are executed. Generally, commands that can be completed without accessing the disk I/O subsystem will have a higher priority in the queue than commands that require a disk access. However, under appropriate circumstances, a disk I/O command may be completed first. Cache only commands may be sequenced for efficiency, and not be executed in the order received.

At step 355, once the command is completed, the I/O controller returns the command status to the operating system.

The present invention may be implemented in a variety of forms, using software and/or firmware, running on a processor for a computing system. The code can be provided in any machine-readable medium, including magnetic or optical disk, or in memory.

While there have been shown and described examples of the present invention, it will be readily apparent to those skilled in the art that various changes and modifications may be made without departing from the scope of the invention as defined by the following claims. In general, many of the specific steps in the process described above can be carried out in a different sequence. The I/O controller, for example, can first determine whether a command can be completed without accessing the disk I/O subsystem, and then determine whether the command has been designated "cache only," because in either event the I/O controller will need to determine whether the command can be completed using the cache. Accordingly, the invention is limited only by the following claims and equivalents thereto.

The invention claimed is:

1. A method for controlling an input/output (I/O) control system that includes a cache and an underlying I/O subsystem, the method comprising:
    determining if a load on an I/O queue exceeds a threshold;
    if the load on the I/O queue exceeds the threshold, designating an I/O command as cache only;
    either before or after designating the I/O command as cache only, sending the I/O command to an I/O controller; and
    if the I/O command is designated as cache only:
        adding the I/O command to the I/O queue if the I/O command can be completed without accessing the underlying I/O subsystem; and
        returning the I/O command without adding the I/O command to the I/O queue to be executed if completion of the I/O command involves accessing the underlying I/O subsystem.

2. The method of claim 1, wherein designating the I/O command as cache only includes using an operating system to designate the I/O command as cache only.

3. The method of claim 1, wherein designating the I/O command as cache only includes using the I/O controller to designate the I/O command as cache only.

4. The method of claim 1, wherein determining if a load on an I/O queue exceeds a threshold includes evaluating space available in the queue.

5. The method of claim 1, wherein the I/O command that involves accessing the underlying I/O subsystem is returned to an operating system.

6. A method for controlling an input/output (I/O) control system that includes a cache, an I/O queue, and an underlying I/O subsystem, the method comprising:
    sending an I/O command to an I/O controller;
    determining if a load on the I/O queue exceeds a threshold;
    if the load on the I/O queue exceeds the threshold and completion of the I/O command involves accessing the underlying I/O subsystem, returning the I/O command without adding the I/O command to the I/O queue to be executed; and
    otherwise, adding the I/O command to the I/O queue.

7. A computer program product, residing on a computer-readable medium, for use in controlling an I/O control system, the computer program product comprising instructions for causing a processor to:
    receive an I/O command;
    if the I/O command is designated as cache only and the I/O command can be completed without accessing an underlying I/O subsystem, add the I/O command to an I/O queue;
    if the I/O command is designated as cache only and completion of the I/O command involves accessing the underlying I/O subsystem, return the I/O command without adding the I/O command to the I/O queue to be executed; and
    if the I/O command is not designated as cache only, add the I/O command to the I/O queue.

8. A computer program product, residing on a computer-readable medium, for use in controlling an I/O control system, the computer program product comprising instructions for causing a processor to:
    determine if a load on an I/O queue exceeds a threshold;
    if the load exceeds the threshold, designate an I/O command as cache only;
    send an I/O command; and
    if an I/O command that has been designated as cache only is returned with an error condition indicating that the command involved accessing an underlying I/O subsystem, add the command to a back-up queue without adding the command to the I/O queue to be executed.

* * * * *